United States Patent
Cozzo et al.

(10) Patent No.: US 12,376,076 B2
(45) Date of Patent: Jul. 29, 2025

(54) METHODS AND APPARATUS FOR RESOURCE RESERVATION IN NARROWBAND INTERNET OF THINGS COMMUNICATIONS

(71) Applicant: Huawei Technologies Co., Ltd., Shenzhen (CN)

(72) Inventors: Carmela Cozzo, San Diego, CA (US); Brian Classon, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 600 days.

(21) Appl. No.: 17/662,303

(22) Filed: May 6, 2022

(65) Prior Publication Data
US 2022/0264535 A1    Aug. 18, 2022

Related U.S. Application Data

(63) Continuation of application No. PCT/US2020/054068, filed on Oct. 2, 2020.

(60) Provisional application No. 62/932,244, filed on Nov. 7, 2019, provisional application No. 62/932,227, filed on Nov. 7, 2019.

(51) Int. Cl.
*H04W 72/02* (2009.01)
*H04L 1/1607* (2023.01)
(Continued)

(52) U.S. Cl.
CPC .......... *H04W 72/02* (2013.01); *H04L 1/1614* (2013.01); *H04W 28/26* (2013.01);
(Continued)

(58) Field of Classification Search
CPC . H04W 72/02; H04W 28/26; H04W 72/0446; H04W 72/0453; H04W 72/23; H04W 4/70; H04W 72/20; H04L 1/1614
See application file for complete search history.

(56) References Cited

U.S. PATENT DOCUMENTS

| | | | |
|---|---|---|---|
| 10,772,146 B2* | 9/2020 | Shi | H04W 76/27 |
| 2018/0220288 A1* | 8/2018 | Agiwal | H04W 4/30 |

(Continued)

FOREIGN PATENT DOCUMENTS

WO    2019028276 A1    2/2019

OTHER PUBLICATIONS

Ericsson, "Coexistence of LTE-MTC with NR," 3GPP TSG RAN WG1 Meeting #98bis, R1-1909989, CHongqing, China, Oct. 14-20, 2019, 11 pages.
(Continued)

*Primary Examiner* — Dady Chery
(74) *Attorney, Agent, or Firm* — Slater Matsil, LLP

(57) ABSTRACT

A method includes receiving a higher layer message including reservation information for time domain network resources available for communicating with the plurality of wireless communication protocols; receiving a dynamically signaled message including a reservation indicator of a reservation status of a time domain network resource from the time domain network resources for communicating using a wireless communication protocol; and communicating using machine to machine communications over the wireless communication protocol, the communicating occurring over an available time domain network resource from the time domain network resources.

33 Claims, 9 Drawing Sheets

(51) Int. Cl.
*H04W 28/26* (2009.01)
*H04W 72/0446* (2023.01)
*H04W 72/0453* (2023.01)
*H04W 72/23* (2023.01)

(52) U.S. Cl.
CPC ... *H04W 72/0446* (2013.01); *H04W 72/0453* (2013.01); *H04W 72/23* (2023.01)

(56) References Cited

U.S. PATENT DOCUMENTS

| | | | |
|---|---|---|---|
| 2019/0116592 A1* | 4/2019 | Moon | H04L 5/0092 |
| 2019/0239123 A1* | 8/2019 | Kim | H04W 88/023 |
| 2019/0281641 A1* | 9/2019 | Cheng | H04L 41/08 |
| 2019/0342944 A1* | 11/2019 | Chatterjee | H04W 80/08 |
| 2020/0021998 A1* | 1/2020 | Baldemair | H04W 16/14 |
| 2020/0037343 A1* | 1/2020 | He | H04W 72/20 |
| 2020/0163048 A1* | 5/2020 | Kim | H04W 72/12 |
| 2020/0245231 A1* | 7/2020 | Wei | H04W 48/10 |
| 2020/0280524 A1* | 9/2020 | Guo | H04L 5/0048 |
| 2020/0280945 A1* | 9/2020 | Tiirola | H04W 74/0808 |
| 2020/0280999 A1* | 9/2020 | Guo | H04W 72/542 |

OTHER PUBLICATIONS

Nokia, et al., "Coexistence of eMTC with NR," 3GPP TSG RAN WG1 Meeting #98bis, R1-1910248, Agenda Item 6.2.1.4, Chongqing, China, Oct. 14-20, 2019, 4 pages.

* cited by examiner

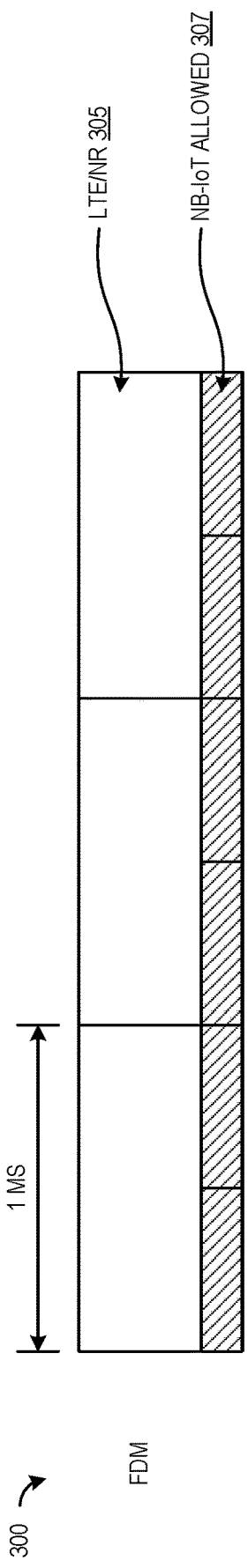
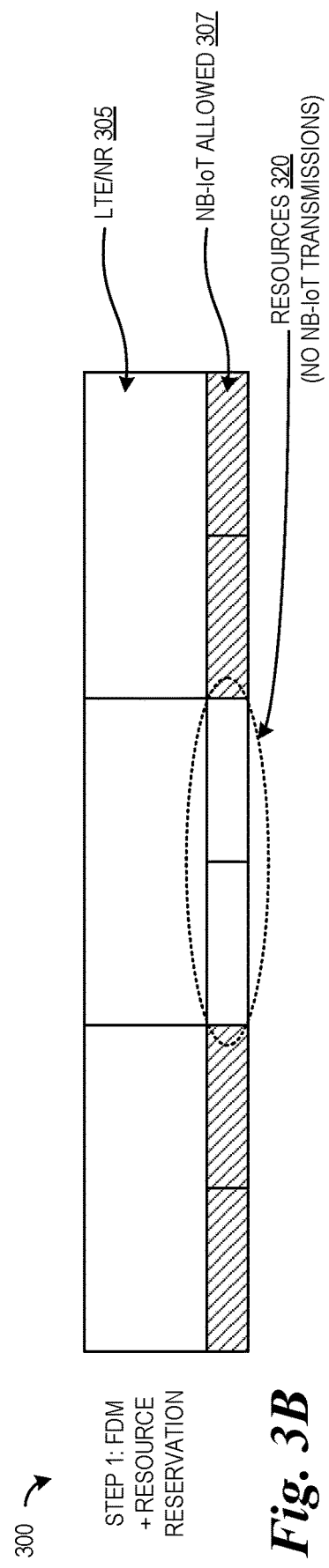

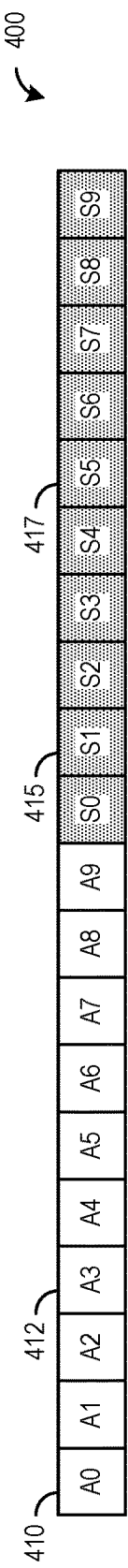
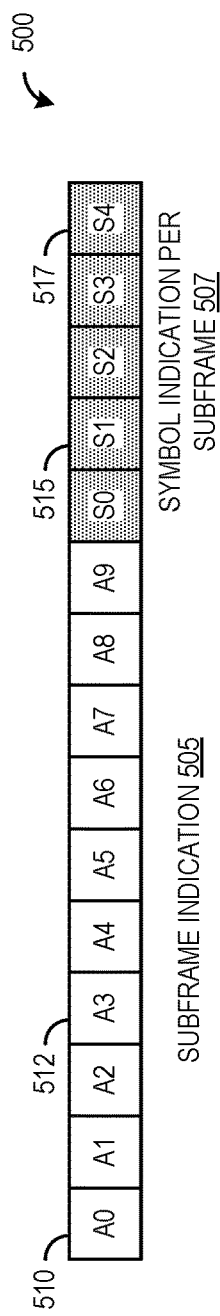
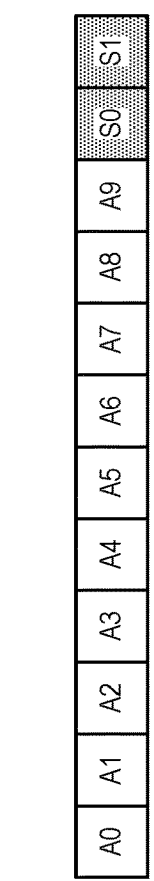
Fig. 4
Fig. 5
Fig. 6

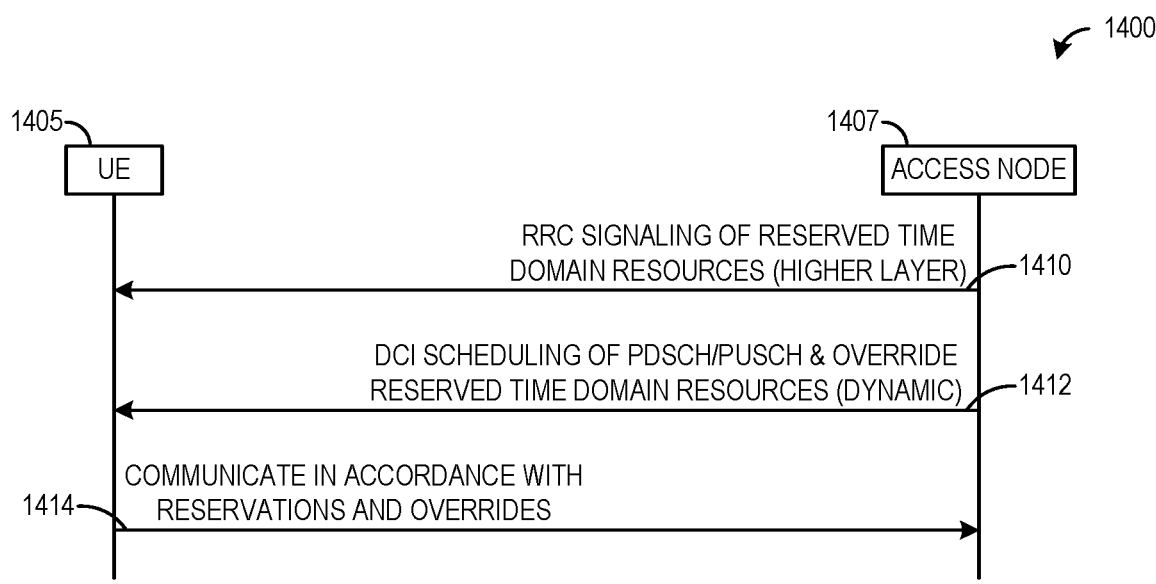
*Fig. 14*
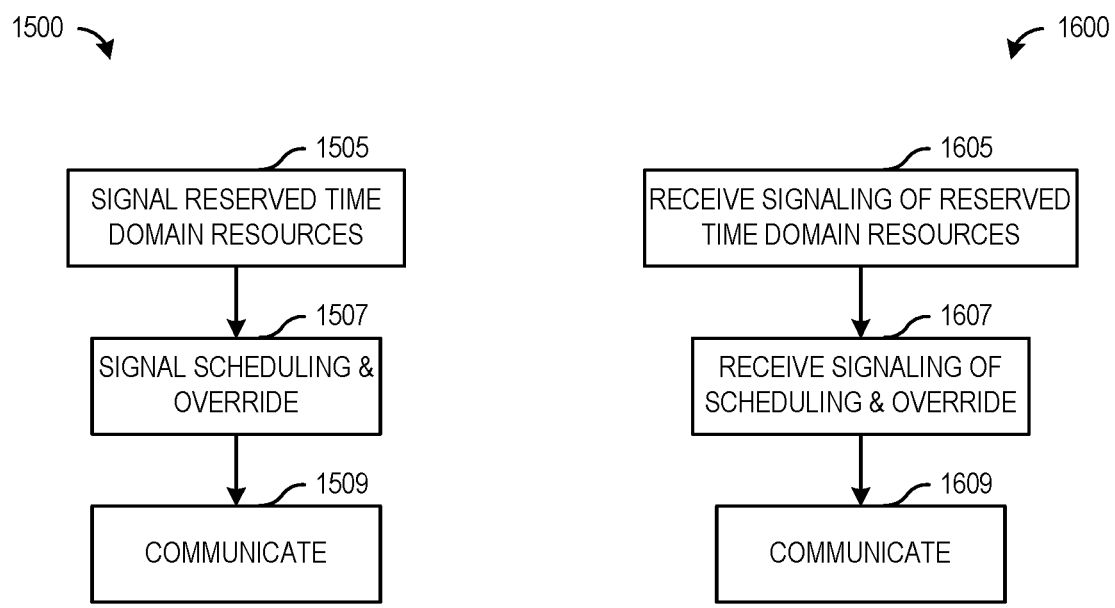
*Fig. 15*
*Fig. 16*

METHODS AND APPARATUS FOR RESOURCE RESERVATION IN NARROWBAND INTERNET OF THINGS COMMUNICATIONS

CROSS-REFERENCE TO RELATED APPLICATIONS

This application is a continuation of International Application PCT/US2020/054068, filed on Oct. 2, 2020, entitled "Methods and Apparatus for Resource Reservation in Narrowband Internet of Things Communications," which claims the benefit of U.S. Provisional Application No. 62/932,227, filed on Nov. 7, 2019, entitled "Methods and Apparatus for Resource Reservation in Long Term Evolution—Machine Type Communications," and U.S. Provisional Application No. 62/932,244, filed on Nov. 7, 2019, entitled "Methods and Apparatus for Resource Reservation in Narrowband Internet of Things Communications," which applications are hereby incorporated herein by reference in their entirety.

TECHNICAL FIELD

The present disclosure relates generally to methods and apparatus for digital communications, and, in particular embodiments, to methods and apparatus for resource reservation in narrow band Internet of Things communications.

BACKGROUND

Current generation wireless communications systems provide high data rates for mobile communications devices to enable a rich multi-media environment for users of the mobile communications devices. However, the complexity of applications available to the users continues to increase, along with the need for increased throughput and lower latency.

SUMMARY

According to a first aspect, a method implemented by a first device of a communication system supporting coexistence of a plurality of wireless communication protocols over a shared communication channel is provided. The method comprising: receiving, by the first device from a second device, a higher layer message including reservation information for time domain network resources available for communicating with the plurality of wireless communication protocols; receiving, by the first device from the second device, a dynamically signaled message including a reservation indicator of a reservation status of a time domain network resource from the time domain network resources for communicating using a wireless communication protocol; and communicating, by the first device, using machine to machine communications over the wireless communication protocol, the communicating occurring over an available time domain network resource from the time domain network resources.

In a first implementation form of the method according to the first aspect, the dynamically signaled message further including a resource assignment indicating the available time domain network resource.

In a second implementation form of the method according to the first aspect or any preceding implementation form of the first aspect, further comprising selecting, by the first device, the available time domain network resource from the time domain network resources, the selecting being in accordance with the reservation indicator.

In a third implementation form of the method according to the first aspect or any preceding implementation form of the first aspect, the dynamically signaled message comprising a downlink control information (DCI) message.

In a fourth implementation form of the method according to the first aspect or any preceding implementation form of the first aspect, the reservation indicator comprising a single bit indicator associated with the time domain network resource.

In a fifth implementation form of the method according to the first aspect or any preceding implementation form of the first aspect, the reservation indicator being equal to 1 indicating the reservation status of the time domain network resource being available.

In a sixth implementation form of the method according to the first aspect or any preceding implementation form of the first aspect, the reservation indicator being equal to 0 indicating follow the reservation information associated with the time domain network resource.

In a seventh implementation form of the method according to the first aspect or any preceding implementation form of the first aspect, the reservation information comprising a bitmap associated with the time domain network resource.

In an eighth implementation form of the method according to the first aspect or any preceding implementation form of the first aspect, the bitmap being 20 bits or 80 bits in length.

In a ninth implementation form of the method according to the first aspect or any preceding implementation form of the first aspect, the reservation indicator comprising two bits, with a first bit corresponding to a first subframe of a slot and a second bit corresponding to a second subframe of the slot.

In a tenth implementation form of the method according to the first aspect or any preceding implementation form of the first aspect, the reservation information comprising a bitmap with each bit of the bitmap corresponding to a symbol of a slot.

In an eleventh implementation form of the method according to the first aspect or any preceding implementation form of the first aspect, the bitmap comprising 7 bits.

In a twelfth implementation form of the method according to the first aspect or any preceding implementation form of the first aspect, the first device comprising a user equipment (UE) and the second device comprising an access node.

In a thirteenth implementation form of the method according to the first aspect or any preceding implementation form of the first aspect, the time domain network resources comprising at least one of subframes, slots, symbols, or groups of symbols.

According to a second aspect, a method implemented by a first device of a communication system supporting communication using a plurality of wireless communication protocols over a shared communication channel is provided. The method comprising: sending, by the first device to a second device, a higher layer message including reservation information for time domain network resources available for communicating over the plurality of wireless communication protocols; sending, by the first device to the second device, a dynamically signaled message including a reservation indicator indicating a reservation status of a time domain network resource from the time domain network resources for communicating using a first wireless communication protocol; and communicating, by the first device, using machine to machine communications over the wireless communication protocol, the communicating being in accordance with the reservation indicator.

In a first implementation form of the method according to the second aspect, the dynamically signaled message further including a resource assignment indicating an available time domain network resource, and the communicating occurring over the available time domain network resource.

In a second implementation form of the method according to the second aspect or any preceding implementation form of the second aspect, the reservation indicator comprising a single bit indicator associated with the time domain network resource.

In a third implementation form of the method according to the second aspect or any preceding implementation form of the second aspect, the reservation indicator being equal to 1 indicating the reservation status of the time domain network resource being available.

In a fourth implementation form of the method according to the second aspect or any preceding implementation form of the second aspect, the reservation indicator being equal to 0 indicating follow the reservation information associated with the time domain network resource.

In a fifth implementation form of the method according to the second aspect or any preceding implementation form of the second aspect, the second device comprising a UE and the first device comprising an access node.

According to a third aspect, a first device is provided. The first device comprising: one or more processors; and a non-transitory memory storage comprising instructions that, when executed by the one or more processors, cause the first device to: receive, from a second device, a higher layer message including reservation information for time domain network resources available for communicating with a plurality of wireless communication protocols; receive, from the second device, a dynamically signaled message including a reservation indicator indicating a reservation status of a time domain network resource from the time domain network resources for communicating using a wireless communication protocol; and communicating using machine to machine communications over the wireless communication protocol, the communicating occurring over an available time domain network resource from the time domain network resources.

In a first implementation form of the first device according to the third aspect, the dynamically signaled message further including a resource assignment indicating the available time domain network resource.

In a second implementation form of the first device according to the third aspect or any preceding implementation form of the third aspect, the instructions further causing the first device to select the available time domain network resource from the time domain network resources, the available time domain network resource being selected in accordance with the reservation indicator.

In a third implementation form of the first device according to the third aspect or any preceding implementation form of the third aspect, the dynamically signaled message comprising a DCI message.

In a fourth implementation form of the first device according to the third aspect or any preceding implementation form of the third aspect, the reservation indicator comprising a single bit indicator associated with the time domain network resource.

In a fifth implementation form of the first device according to the third aspect or any preceding implementation form of the third aspect, the reservation indicator being equal to 1 indicating the reservation status of the time domain network resource being available.

In a sixth implementation form of the first device according to the third aspect or any preceding implementation form of the third aspect, the reservation indicator being equal to 0 indicating follow the reservation information associated with the time domain network resource.

In a seventh implementation form of the first device according to the third aspect or any preceding implementation form of the third aspect, the reservation indicator comprising a bitmap associated with the time domain network resource.

In an eighth implementation form of the first device according to the third aspect or any preceding implementation form of the third aspect, the reservation indicator comprising two bits, with a first bit corresponding to a first subframe of a slot and a second bit corresponding to a second subframe of the slot.

In a ninth implementation form of the first device according to the third aspect or any preceding implementation form of the third aspect, the reservation information comprising a bitmap with each bit of the bitmap corresponding to a symbol of a slot.

In a tenth implementation form of the first device according to the third aspect or any preceding implementation form of the third aspect, the bitmap comprising 7 bits.

According to a fourth aspect, a first device is provided. The first device comprising: one or more processors; and a non-transitory memory storage comprising instructions that, when executed by the one or more processors, cause the first device to: send, to a second device, a higher layer message including reservation information for time domain network resources available for communicating over a plurality of wireless communication protocols; send, to the second device, a dynamically signaled message including a reservation indicator indicating a reservation status of a time domain network resource from the time domain network resources for communicating using a first wireless communication protocol; and communicate using machine to machine communications over the wireless communication protocol, the communicating being in accordance with the reservation indicator.

In a first implementation form of the first device according to the fourth aspect, the dynamically signaled message further including a resource assignment indicating an available time domain network resource, and the communicating occurring over the available time domain network resource In a second implementation form of the first device according to the fourth aspect or any preceding implementation form of the fourth aspect, the reservation indicator comprising a single bit indicator associated with the time domain network resource.

In a third implementation form of the first device according to the fourth aspect or any preceding implementation form of the fourth aspect, the reservation indicator being equal to 1 indicating the reservation status of the time domain network resource being available.

In a fourth implementation form of the first device according to the fourth aspect or any preceding implementation form of the fourth aspect, the reservation indicator being equal to 0 indicating follow the reservation information associated with the time domain network resource.

An advantage of a preferred embodiment is that narrowband Internet of Things (NB IoT) communications do not collide with LTE or New Radio (NR) communications while preserving spectral efficiency.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3A illustrates a time-frequency resource grid with the time-frequency resources allocated in a FDM manner according to example embodiments presented herein;

FIG. 3B illustrates time-frequency resource grid highlighting resource reservations to change an existing time-frequency resource allocation according to example embodiments presented herein;

FIG. 4 illustrates a 20-bit bitmap for a narrowband Internet-of-Things (NB-IoT) DL subframe configuration over 10 ms, with a subframe based symbol reservation pattern according to example embodiments presented herein;

FIG. 5 illustrates a 15-bit bitmap for a NB-IoT DL subframe configuration over 10 ms, with slot based symbol reservation pattern according to example embodiments presented herein;

FIG. 6 illustrates a bitmap with x=2 bits for a NB-IoT downlink subframe configuration over 10 ms according to example embodiments presented herein;

FIG. 14 illustrates a diagram of messages exchanged between devices reserving resources and communicating over the reserved resources according to example embodiments presented herein;

FIG. 15 illustrates a flow diagram of example operations occurring in an access node reserving resources and communicating over the reserved resources according to example embodiments presented herein;

FIG. 16 illustrates a flow diagram of example operations occurring in a UE receiving indications of reserved resources and communicating over the reserved resources according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
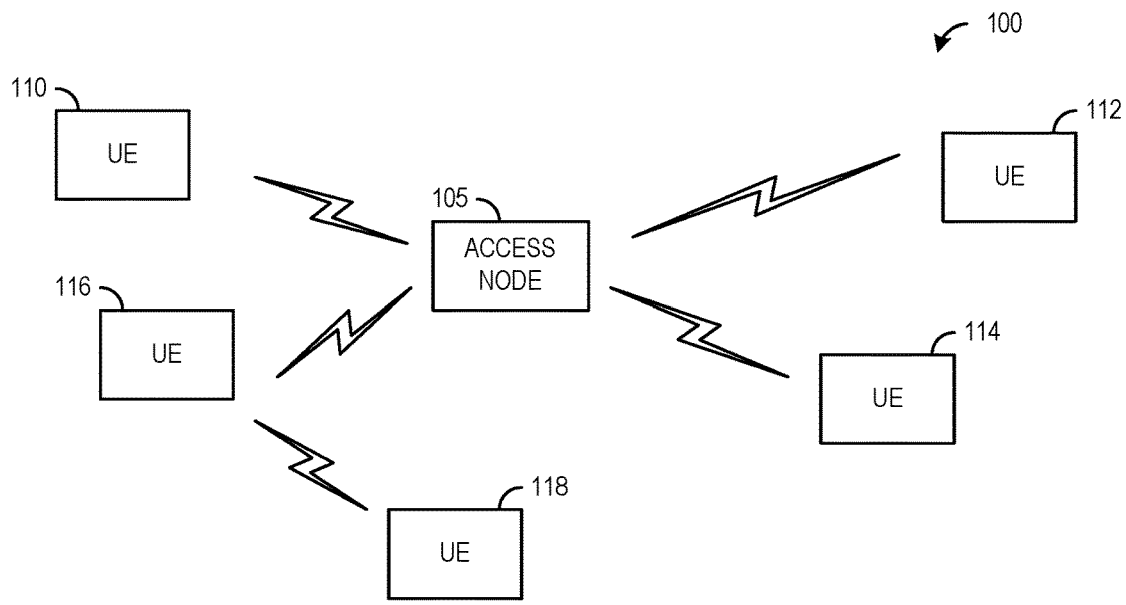
FIG. 1 illustrates an example communications system.

FIG. 1 illustrates an example communications system 100. Communications system 100 includes an access node 105 serving user equipments (UEs), such as UEs 110-118. In a first operating mode, communications to and from a UE passes through access node 105. In a second operating mode, communications to and from a UE do not pass through access node 105, however, access node 105 typically allocates resources used by the UE to communicate when specific conditions are met. As shown in FIG. 1, UE 116 and UE 118 are communicating to each other without interaction with access node 105. Communication between a UE and access node pair occur over uni-directional communication links, where the communication links between the UE and the access node are referred to as uplinks, and the communication links between the access node and UE is referred to as downlinks.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G New Radio (NR), sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and five UEs are illustrated for simplicity.

Resource reservation is a technique where resources that are not used for transmission are configured for other purposes. For narrowband Internet of Things (NB-IoT) communications, a short range low power wireless communication protocol, a transmission could last for an extended amount of time, especially for deep coverage UEs. Because NB-IoT can be deployed in bands where LTE or NR is also deployed, in order to improve performance and avoid overlapping, a resource reservation is used to allow coexistence of NB-IoT with LTE or NR in case of overlapping carriers.

A similar mechanism is also used for NR resources in the downlink in case of overlapping of NR and LTE carriers, where a downlink control information (DCI) scheduling physical downlink shared channel (PDSCH) can indicate a rate-matching pattern that allows reserving resources elements where PDSCH and demodulation reference signals (DMRS) cannot be mapped.

In NB-IoT communication systems, each physical resource block (PRB) in a resource grid is defined as a slot of 7 consecutive OFDM symbols in the time domain and 12 consecutive subcarriers in the frequency domain, i.e., each resource block contains 12×7 resource elements (REs). The RE is the smallest physical channel unit. One PRB pair is a subframe and has duration of 1 ms. In the downlink (DL), the subcarrier spacing (SCS) is 15 kHz. In the uplink (UL), multitone transmissions can use 12, 6 or 3 subcarriers with SCS of 15 kHz, and single-tone transmissions can use 15 kHz or 3.75 kHz SCSs. For the UL, the resource unit (RU) depends on the subcarrier spacing and the number of subcarriers: for 12 subcarriers and SCS of 15 kHz, the RU corresponds to a PRB pair with 14 OFDM symbols and duration of 1 ms. For sub-PRB scheduling assignments of 6, 3, or 1 subcarrier, the RU has duration of {2, 4, 8} ms, respectively.

For LTE, each PRB in the grid is defined as a slot of 7 consecutive OFDM symbols in the time domain and 12 consecutive subcarriers in the frequency domain, i.e., each resource block contains 12×7 REs. When used as a frequency-domain unit, a PRB is 12 consecutive subcarriers. There are 7 symbols in a slot when a normal cyclic prefix is used and 6 symbols in a slot when an extended cyclic prefix is used. The duration of a symbol is inversely proportional to the SCS which is 15 kHz, and the duration of a slot is 0.5 ms In NR mobile broadband (MBB), each PRB-pair in a resource grid is defined as a slot of 14 consecutive OFDM symbols in the time domain and 12 consecutive subcarriers in the frequency domain, i.e., each resource block contains 12×14 REs. There are 14 symbols in a slot when a normal cyclic prefix is used and 12 symbols in a slot when an extended cyclic prefix is used. The duration of a symbol is inversely proportional to the SCS. For a {15, 30, 60, or 120}kHz SCS, the duration of a slot is {1, 0.5, 0.25, or 0.125} ms, respectively.

Each PRB may be allocated to any combination of control channels, shared channels, feedback channels, reference signals, and so on. In addition, some REs of a PRB may be reserved. A communication resource may be a PRB, a set of PRBs, a code (if code division multiple access (CDMA) is used, similarly as for the physical uplink control channel (PUCCH)), a physical sequence, a set of REs, and so on.

In NB-IoT and NR deployments that occur in the same carrier or carriers, it would then be possible to have a collision between NR and NB-IoT transmissions, especially when multiple NB-IoT non-anchor carriers are configured. Some NB-IoT resources can be reserved to avoid this overlap repeatedly with NR services. One example is for a NR ultra-reliable low latency communications (URLLC) service that uses several contiguous resource blocks for a single transmission due to the high reliability and tight latency requirements. Based on the flexible NR scheduling, a resource reservation for NB-IoT is introduced with subframe/slot/symbol granularity for both DL and UL transmissions. A reserved resource is labelled as an invalid resource (in the sense that NB-IoT transmissions cannot use that resource). Reserved resources are configured by higher layer parameters, and are therefore a semi-static or slow configuration in nature.

According to an example embodiment, in addition to the configuration of resources (e.g., a resource reservation), reserved resources can be signaled to the UE via physical layer signaling in order to dynamically adapt the availability of resources for NB-IoT transmission to the NR scheduling. An example of physical layer signaling is dynamic DCI signaling.

In an embodiment, dynamic DCI signaling may be used to indicate which reserved resources may actually be used for the scheduled NB-IoT transmission. Dynamic signaling is useful if the access node schedules the NB-IoT transmission in resources that were configured as reserved resources. The resource granularity indicated by the dynamic DCI signaling can be of the same or finer granularity of the configured reserved resources by higher layer signaling. For example, if a subframe is configured as reserved (i.e., an invalid subframe) by higher layer signaling, the dynamic signaling can indicate that a NB-IoT transmission can take place in that subframe (in this case, the DCI signaling indicates the same granularity for the reserved resources with respect to the granularity of the configured reserved resources by higher layer signaling) or in a portion of the subframe (in this case, the DCI signaling indicates a finer granularity for the reserved resources with respect to the granularity of the configured reserved resources by higher layer signaling). In an embodiment, the DCI field for UL or DL transmission is only present if a higher layer parameter indicating reserved resources is configured for the UL (e.g., reserved-resource-config-UL) or DL (e.g., reserved-resource-config-DL), respectively.

In an embodiment, dynamic DCI signaling may be used to indicate, as reserved, for example, a resource that is configured by higher layer signaling as being reserved or available. Dynamic DCI signaling may be used to indicate, as available, for example, a resource configured by higher layer signaling as being reserved or available. A resource can be a subframe, a slot, a group of symbols, one symbol, etc.

In the DL, narrowband reference signals (NRS) are transmitted by the access node and used by the UE to estimate the DL channel coefficients and perform DL signal strength and quality measurements both in idle and connected modes. The NRS is transmitted in the last two OFDM symbols in every slot that carries a narrowband physical broadcast channel (NPBCH), a narrowband physical downlink control channel (NPDCCH), or a narrowband physical downlink shared channel (NPDSCH), in certain subcarriers. If an NRS symbol is reserved as being available for NB-IoT transmissions, then NB-IoT transmission in the NRS symbol may have an impact on the channel estimation for the NPDSCH in that slot. It is preferred to not configure NRS symbols as reserved resources.

Figure 2:
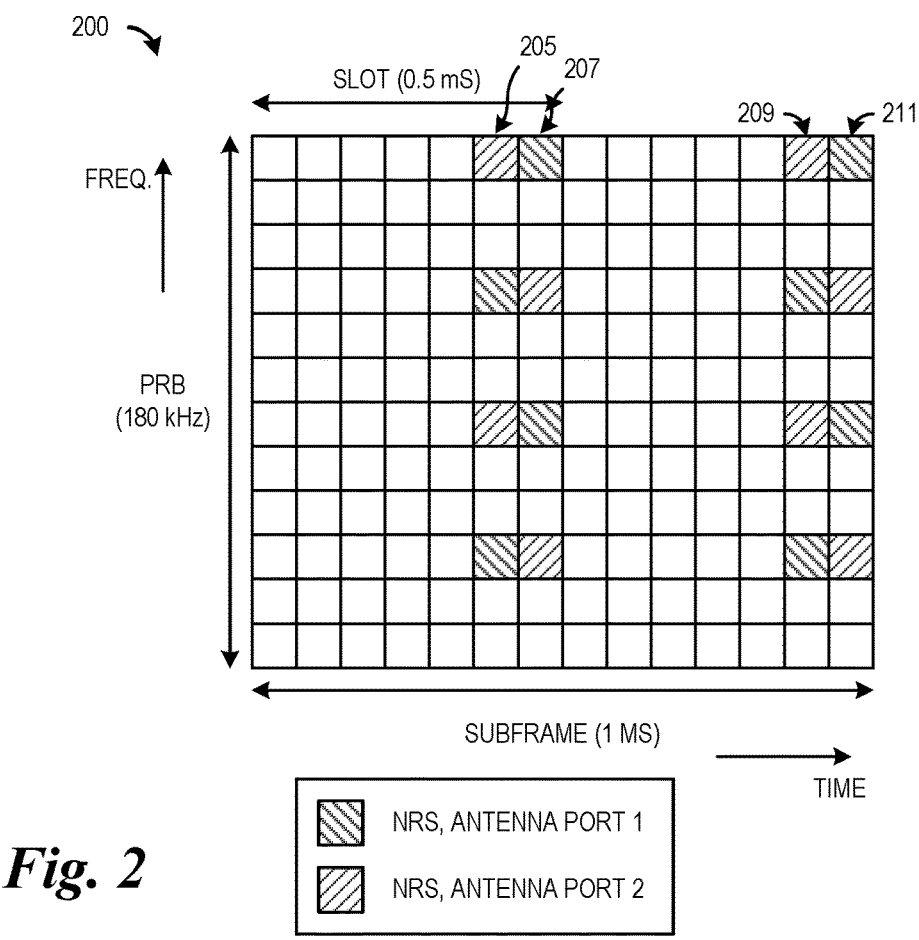
FIG. 2 illustrates a downlink (DL) subframe.

FIG. 2 illustrates a DL subframe 200. DL subframe 200 comprises two slots with a total of 14 consecutive OFDM symbols in the time domain and 12 consecutive subcarriers in the frequency domain. Symbols #5 205, #6 207, #12 209, and #13 211 cannot be configured as reserved symbols, hence the DCI signaling that indicates which symbols (configured as reserved) can be used for NB-IoT transmission should exclude these four symbols in a subframe where NRS are transmitted.

According to an example embodiment, in the time domain, some symbols can be configured as reserved resources by higher layer signaling. In an embodiment, a bitmap is used to configure a resource reservation in the time domain. DCI signaling can be used to indicate which symbols can be instead used for the UL (or the DL) NB-IoT transmissions.

In an embodiment, the DCI signaling comprises a field to indicate a resource reservation in the time domain, signaling which symbol carries (or symbols carry) the NB-IoT transmission. The field in the DCI signaling may be referred to as a reservation indicator or a reservation indication. The reservation indicator indicates the reservation status of a time domain resource, for example.

FIG. 3A illustrates a time-frequency resource grid 300 with the time-frequency resources allocated in a FDM manner. As shown in FIG. 3A, time-frequency resource grid 300 includes three 1 ms subframes with the time-frequency resources allocated for LTE or NR transmissions, as well as NB-IoT transmissions, in a FDM manner. The allocation of the time-frequency resources in a FDM manner means that the resources are allocated on a frequency basis, with resources allocated for a first type of transmissions (e.g., LTE or NR transmissions) are separated from resources allocated for a second type of transmissions (e.g., NB-IoT transmissions). Resources 305 allocated for LTE or NR transmissions are in a first frequency range, while resources 307 allocated for NB-IoT transmissions are in a second frequency range. The allocation of the time-frequency resources may be performed utilizing higher layer signaling. The configuring of the time-frequency resources may utilize a bitmap, for example. In FIG. 3A, more resources are allocated to resources 305. However, the resources allocated to any type of transmission may change, to meet communication requirements, for example. Therefore the illustration of more resources being allocated to LTE or NR transmissions than NB-IoT transmissions should not be construed as being limiting to the scope of the example embodiments.

FIG. 3B illustrates time-frequency resource grid 300 highlighting resource reservations to change an existing time-frequency resource allocation. As shown in FIG. 3B, time-frequency resources of time-frequency resource grid 300 are allocated in a FDM manner, with resources 305 being allocated for LTE or NR transmissions are in a first frequency range, while resources 307 are allocated for NB-IoT transmissions are in a second frequency range. The reservation of the resources in time-frequency resource grid 300 may be specified using reservation information provided in a higher layer message. However, dynamic signaling (e.g., DCI signaling) may be used to change an existing time-frequency resource allocation.

Figure 3C:
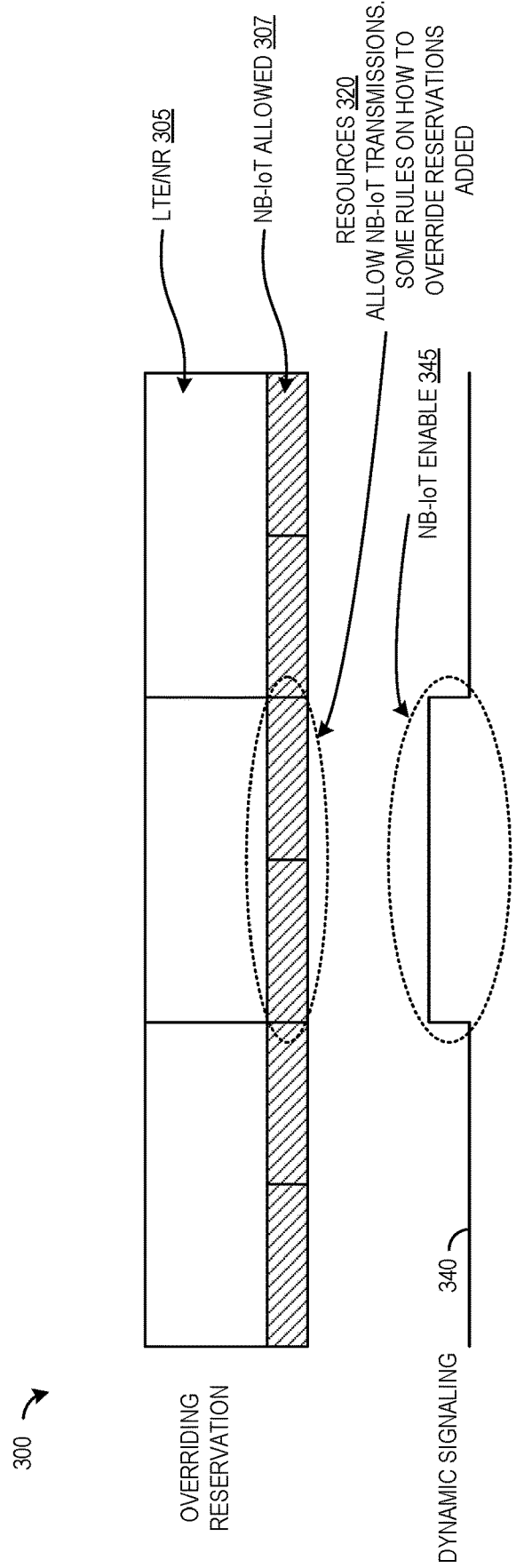
FIG. 3C illustrates time-frequency resource grid highlighting further resource reservations to override an existing time-frequency resource allocation according to example embodiments presented herein.

As shown in FIG. 3B, resources 320 have been configured so that no NB-IoT transmissions are permitted on resources 320. As discussed herein, the allocation of the time-frequency resources using higher layer signaling may be changed using dynamic signaling, such as DCI signaling. As an example, the allocation of the resources of resources 320 may be changed on a subframe, a slot, a symbol, or a group of symbols basis by the dynamic signaling, as will be shown in FIG. 3C. Resources 320, as shown in FIG. 3B, are configured so that no NB-IoT transmission can take place.

FIG. 3C illustrates time-frequency resource grid 300 highlighting further resource reservations to override an existing time-frequency resource allocation. As an example, resources 320 have previously been configured to prevent NB-IoT transmissions (as shown in FIG. 3B), using reservation information in a higher layer message, for example. However, some or all of the resources of resources 320 may be reconfigured to allow NB-IoT transmissions. A trace 340 represents dynamic signaling that indicates the enabling of NB-IoT transmissions on resources. In other words, trace 340 represents the overriding of the configuration of resources. As shown in FIG. 3C, when trace 340 is high (shown in highlight 345), resources 320 (which were previously allocated for NB-IoT transmissions by higher layer signaling but subsequently configured to not allow NB-IoT transmissions (as shown in FIG. 3B)) are overridden to support NB-IoT transmissions. Although shown in FIG. 3C as overriding existing resource configurations when logically high, trace 340 may be configured to override existing resource configurations when logically low. In such a situation, trace 340 would be a logical inverse of what is shown in FIG. 3C.

According to an example embodiment, the reservation indication of reserved resources for a DL or UL transmission is sent in the DCI, with a DCI field for resource reservation being 1 bit in size. As an example, the DCI field set to a value 0 indicates that the first slot of the subframe is used for NB-IoT transmission, either all symbols in the slot or, for example, all symbols except pre-specified or pre-determined symbols (e.g., symbols used for the NRS). As another example, the DCI field set to a value 1 indicates that the second slot of the subframe is used for NB-IoT transmission, either all symbols in the slot or, for example, all symbols except pre-specified or pre-determined symbols. The other slot of the subframe (i.e., the second slot when value 0 is used, or the first slot when value 1 is used) remains reserved. A reversal of value assignments is possible.

As an alternative example, the DCI field set to a value 1 indicates that the first slot of the subframe is used for NB-IoT transmission, either all symbols in the slot or, for example, all symbols except pre-specified or pre-determined symbols. As another example, the DCI field set to a value 0 indicates that the second slot of the subframe is used for NB-IoT transmission, either all symbols in the slot or, for example, all symbols except pre-specified or pre-determined symbols. The other slot of the subframe (i.e., the second slot when value 1 is used, or the first slot when value 0 is used) remains reserved.

According to an example embodiment, the reservation indication of reserved resources for a DL or UL transmission is sent in the DCI, with a DCI field for resource reservation being 2 bits {b0, b1} in size. As an example:

The DCI field set to a value 00 indicates that the subframe is used for NB-IoT transmission (all symbols in the subframe, or when the NRS is present, symbols #0 to #13 for the UL, and symbols #0 to #4 and #7 to #11 for the DL);

The DCI field set to a value 01 indicates that the first slot of the subframe is used for NB-IoT transmission (all symbols in the first slot, or when the NRS is present, symbols #0 to #6 for the UL, and symbols #0 to #4 for the DL);

The DCI field set to a value 10 indicates that the second slot of the subframe is used for NB-IOT transmission (all symbols in the second slot, or when the NRS is present, symbols #7 to #13 for the UL, and symbols #7 to #11 for the DL); and The DCI field set to a value 11 is unused or reserved.

Alternate value assignments are possible.

As an alternative example:

The DCI field set to a value 00 is unused or reserved;

The DCI field set to a value 10 indicates that the first slot of the subframe is used for NB-IoT transmission (all symbols in the first slot, or when the NRS is present, symbols #0 to #6 for the UL, and symbols #0 to #4 for the DL);

The DCI field set to a value 01 indicates that the second slot of the subframe is used for NB-IoT transmission (all symbols in the second slot, or when the NRS is present, symbols #7 to #13 for the UL, and symbols #7 to #11 for the DL); and The DCI field set to a value 11 indicates that the subframe is used for NB-IoT transmission (all symbols in the subframe, or when the NRS is present, symbols #0 to #13 for the UL, and symbols #0 to #4 and #7 to #11 for the DL).

Alternate value assignments are possible.

According to an example embodiment, the reservation indication of reserved resources for a DL or UL transmission is sent in the DCI, with a DCI field for resource reservation being 3 bits in size. As an example:

The DCI field set to a value 0 indicates all symbols in the subframe can be used for NB-IoT transmission;

The DCI field set to a value 1 indicates symbols in the first slot: symbols #0 to #6 for UL and symbols #0 to #4 for DL are used for NB-IoT transmission;

The DCI field set to a value 2 indicates symbols #0, #1, #2 are used for NB-IoT transmission;

The DCI field set to a value 3 indicates symbols #3, #4, #5, #6 for UL, and symbols #3, #4 for DL are used for NB-IoT transmission;

The DCI field set to a value 4 indicates symbols #3 to #8 for UL, and symbols #3, #4, #7, #8 for DL are used for NB-IoT transmission;

The DCI field set to a value 5 indicates symbols #7, #8, #9 are used for NB-IoT transmission;

The DCI field set to a value 6 indicates symbols #10, #11, #12, #13 for UL, and symbols #10, #11 for DL are used for NB-IoT transmission; and The DCI field set to a value 7 indicates symbols in the second slot: symbols #7 to #13 for UL and symbols #7 to #11 for DL are used for NB-IoT transmission.

Alternate value assignments are possible. In the above example for the downlink, symbols #5, #6, #12, #13 are assumed to be not reserved and available for DL NRS transmission.

The symbols and value assignments illustrated herein are for discussion purposes only. Other possible symbol and value assignments are possible.

According to an example embodiment, a reservation indication indicates the status of symbols in a group of symbols. As an example, the reservation indication being set to a value 1 indicates that the symbols in a group of symbols can be used for NB-IoT transmissions, while the reservation indication being set to a value 0 indicates that the symbols indicates that the symbols in a group of symbols cannot be used for NB-IoT transmissions. A reversal of the value assignments is possible.

In an embodiment, the groups of symbols are as follows:
For the UL: symbols 0-2, 3-6, 7-9, and 10-13.
For the DL: symbols 0-2, 3-4, 7-9, and 10-11.
The groups are configured so that some groups are the same for the UL and the DL, as well as a DL group being a subset of an UL group. The groups have substantially the same size (within one symbol). Other groupings are possible, such as, in the UL: symbols 0-3, 4-6, 7-10, and 11-13. As another example, in the DL: symbols 0-1, 2-4, 7-8, and 9-11. Other grouping configurations are possible with 3 or 4 groups in the UL and 2 or 3 groups in the DL.

In an embodiment, a bit pattern would indicate value 1 or 0 for all four groups. As an example, 1 bit may indicate: 1100 or 0011. As another example, 2 bits may indicate: 1100, 0011, or 1111. The 2-bit indicator may indicate reserved, not used, or 1110 (if the NRS is still present even if NR PUSCH is not available for the 15 kHz SCS, for example). As yet another example, 3 bits may indicate: 1100, 1000, 0100, 0010, 0001, 0011, or 1111. The 3-bit indicator may indicate reserved, not used, or 1110 (if the SRS is still present even if NR PUSCH is not available for the 15 kHz SCS, for example). As yet another example, 4 bits may indicate for all of the groups, with bit combination 0000 being unused or reserved.

As an alternative, as all of the above with the roles of value 0 and 1 reversed.

According to an example embodiment, a resource granularity indicated by the dynamic DCI signaling is of the same granularity of the configured reserved resources by higher layer signaling. A subframe is configured as reserved (i.e., an invalid subframe) by higher layer signaling, the dynamic signaling indicates that NB-IoT transmission is allowed in that subframe. The DCI field for UL or DL transmission is only present if a higher layer parameter indicating reserved resources is configured for the UL (e.g., reserved-resource-config-UL) or DL (e.g., reserved-resource-config-DL), respectively.

According to an example embodiment, a resource granularity indicated by the dynamic DCI signaling is of finer granularity of the configured reserved resources by higher layer signaling. A subframe is configured as reserved (i.e., an invalid subframe) by higher layer signaling, the dynamic signaling indicates that NB-IoT transmission is allowed in a portion of the subframe (i.e., a group of symbols, symbols in one slot, one symbol). The DCI field for UL or DL transmission is only present if a higher layer parameter indicating reserved resources is configured for the UL (e.g., reserved-resource-config-UL) or DL (e.g., reserved-resource-config-DL), respectively.

According to an example embodiment, dynamic DCI signaling is used to indicate that a resource is reserved. A resource can be a subframe, a slot, a group of symbols, one symbol, etc. As an example, a bitmap-based higher layer signaling indicates that subframe #3 is not reserved (hence, the UE can expect a NB-IoT transmission in subframe #3). The DCI signaling can indicate that:
 the first slot is not reserved and the second slot is reserved;
 the first slot is reserved and the second slot is not reserved; or
 the first slot is reserved and the second slot is reserved.
As another example, a bitmap-based higher layer signaling indicates that subframe #3 is not reserved (hence, the UE can expect a NB-IoT transmission in subframe #3). The DCI signaling can indicate resource reservation for a group of symbols, assuming the symbols of the subframe are grouped in 3 groups:
 group 1 is reserved, group 2 and group 3 are not reserved;
 all other combinations, including the case that the all 3 groups are reserved.

According to an example embodiment, for a UL transmission, the resource reservation indication is a field in DCI format N0, and this DCI field is present if resource reservation for UL is configured.

According to an example embodiment, for a DL transmission, the resource reservation indication is a field in DCI format N1, and this DCI field is present if resource reservation for DL is configured.

According to an example embodiment, symbol-level resource reservation may be performed to enable fine granularity in the resource reservation process.

According to an example embodiment, for symbol-level reserved resource configuration per subframe, a bitmap-based configuration can be used to indicate which symbol is configured as the reserved resource. As discussed previously, in the DL, a NRS is transmitted in the last 2 symbols in a slot, if the NRS symbol is reserved (i.e., if NB-IoT transmissions are allowed in the NRS symbol) then it may have impact on the channel estimation for a NPDSCH transmitted in that slot. Hence, it may be preferred to not configure NRS symbols as reserved resources. In this case 10 bits are sufficient for each symbol in one subframe to indicate whether it is reserved or not, assuming the last two symbols in a slot are always not reserved. This can reduce the signaling overhead compared with 14-bit bitmap configuration for one subframe. For symbol-level resource reservation in the DL, the configuration signaling is a bitmap of 20 (or 50) bits where for the first 10 (or 40) bits, each bit indicates whether there is at least one reserved bit for NB-IoT transmission in each subframe. The last 10 bits indicate which symbols are reserved. The 10 bits refer to symbols #0 to #4 and symbols #7 to #11 in a subframe. As an example, a value 0 in the bitmap indicates that the corresponding symbol is invalid for downlink transmission, while a value 1 in the bitmap indicates that the corresponding symbol is valid for downlink transmission. A reversal of the value assignments is possible.

FIG. 4 illustrates a 20-bit bitmap 400 for a NB-IoT DL subframe configuration over 10 ms, with a subframe based symbol reservation pattern. As shown in FIG. 4, subframe indications 405 (such as subframe indication A0 410 and A3 412) indicate the subframes that have been reserved (at least partially), and symbol indications 407 (such as symbol indication S1 415 and S5 417) indicate the symbols of a subframe that have been reserved. The symbol indications may be applicable to each reserved subframe. If the NB-IoT DL subframe configuration is over 40 ms, the bitmap would be 50 bits long.

In an alternative to the configuration shown in FIG. 4, the symbol indication per subframe 407 occurs before the subframe indication 405, i.e., s0 s1 s2 s3 s4 s5 s6 s7 s8 s9 a0 a1 a2 a3 a4 a5 a6 a7 a8 a9.

An example DL-Bitmap-NB-reserved-resources information element (IE) is as follows:

```
-- ASN1START
DL-Bitmap-NB-reserved-resources-r16 ::=    CHOICE {
    subframePattern10-r16                   BIT STRING (SIZE (20)),
    subframePattern40-r16                   BIT STRING (SIZE (50))
}
-- ASN1STOP.
```

Alternatively, the length of the bitmap can be 24 bits if the symbol indication per subframe has length 14: {s0, s1, . . . , s13}, where each bit corresponds to one symbol in the subframe.

According to an embodiment, in a situation with symbol-level resource reservation per slot, a bitmap-based configuration can be used to indicate which symbol is configured as the reserved resource. In the DL, the configuration signaling is a bitmap of 15 (or 45) bits where for the first 10 (or 40) bits, each bit indicates whether there is at least one reserved bit for NB-IoT transmission in each subframe. The last 5 bits indicate which symbols in a slot are reserved. The symbol resource reservation symbol-pattern is the same for the first and second slot of a subframe. A value 0 in the bitmap indicates that the corresponding symbol is invalid for downlink transmission, while a value 1 in the bitmap indicates that the corresponding symbol is valid for the DL transmission. A reversal of the value assignments is possible.

FIG. 5 illustrates a 15-bit bitmap 500 for a NB-IoT DL subframe configuration over 10 ms, with slot based symbol reservation pattern. As shown in FIG. 5, subframe indications 505 (such as subframe indication A0 510 and A3 512) indicate the subframes with slots that have been reserved (at least partially), and symbol indications 507 (such as symbol indication S1 515 and S4 517) indicate the symbols of a slot of a subframe that have been reserved. The symbol indications may be applicable to each reserved subframe. If the NB-IoT DL subframe configuration is over 40 ms, the bitmap would be 45 bits long.

In an alternative to the configuration shown in FIG. 5, the symbol indication per subframe 507 occurs before the subframe indication 505, i.e., s0 s1 s2 s3 s4 a0 a1 a2 a3 a4 a5 a6 a7 a8 a9.

An example DL-Bitmap-NB-reserved-resources IE is as follows:

```
-- ASN1START
DL-Bitmap-NB-reserved-resources-r16 ::=    CHOICE {
    subframePattern10-r16                   BIT STRING (SIZE (15)),
    subframePattern40-r16                   BIT STRING (SIZE (45))
}
-- ASN1STOP.
```

Alternatively, the length of the bitmap can be 17 bits if the symbol indication per subframe has length 14: {s0, s1, . . . , s13}, where each bit corresponds to one symbol in one slot.

According to an example embodiment, in a situation for symbol-level reserved resource configuration per group of symbols, a bitmap-based configuration can be used to indicate which symbol is configured as the reserved resource. In the DL, the configuration signaling is a bitmap of 10+x (or 40+x) bits where for the first 10 (or 40) bits, each bit indicates whether there is at least one reserved bit for NB-IoT transmission in each subframe. The last x bits indicate the pattern of resource reservation for x symbols. A value 0 in the bitmap indicates that the corresponding symbol is invalid for downlink transmission, while a value 1 in the bitmap indicates that the corresponding symbol is valid for downlink transmission. A reversal of the value assignments is possible.

FIG. 6 illustrates a bitmap 600 with x=2 bits for a NB-IoT downlink subframe configuration over 10 ms. As shown in FIG. 6, subframe indications 605 indicate the subframes with symbol groups that have been reserved, and symbol indications 607 indicate the symbol groups that have been reserved. If the configuration is over 40 ms, the bitmap has size of 42 bits.

Figure 7:
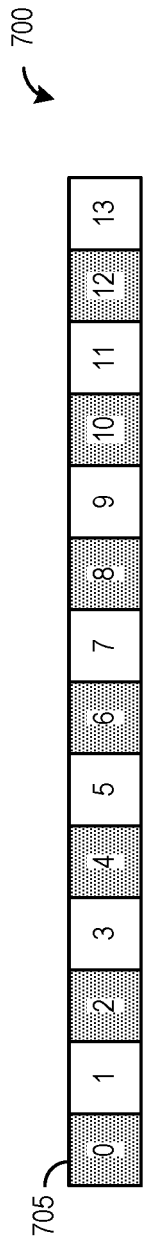
FIG. 7 illustrates an example bitmap highlighting reserved symbols according to example embodiments presented herein.

FIG. 7 illustrates an example bitmap 700 highlighting reserved symbols. As an example, if a bitmap 0 705 comprises a single bit with value 0, meaning that the first symbol is reserved. Bitmap 700 may be used for a situation where it is assumed that each of the 7 symbols in the first slot and 7 symbols in the second slot, 14 symbols in all, may be reserved, and the reserved symbols are shown as shaded boxes. Bitmap 700 corresponds to a case where x=7 bits per slot, with a first x=7 bits corresponding to a first slot of a subframe (pair of slots) and a second x=7 bits corresponding to a second slot of a subframe. A bitmap of reserved symbols may be provided for none, one, or both of the slots of a subframe.

Figure 8:
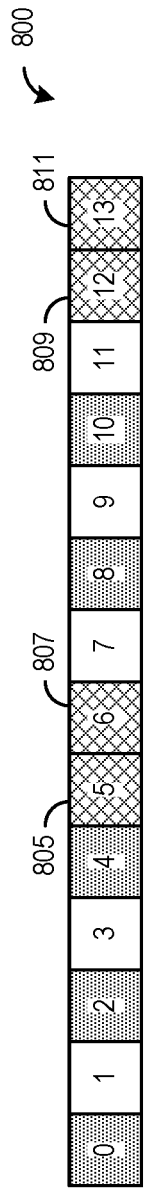
FIG. 8 illustrates an example bitmap highlighting a limited number of reserved symbols according to example embodiments presented herein.

FIG. 8 illustrates an example bitmap 800 highlighting a limited number of reserved symbols. Bitmap 800 corresponds to a case where it is assumed that only 10 symbols per subframe could be reserved, because symbols #5 805, #6 807, #12 809, and #13 811 cannot be reserved because of NRS transmission, these symbols are the symbols shown as being cross-hatched. In an example configuration, the reserved symbols are symbols shown as shaded boxes, and symbols that may be used for NB-IoT transmission symbols shown as clear boxes. Bitmap 800 corresponds to a case where x=5 bits per slot, with a first x=5 bits corresponding to a first slot of a subframe (pair of slots) and a second x=5 bits corresponding to a second slot of a subframe. A bitmap of reserved symbols may be provided for none, one, or both of the slots of a subframe.

According to an embodiment, in a situation with a subframe, slot, or symbol reserved pattern, in the DL, the configuration signaling is a bitmap where 10 bits indicate whether a subframe is reserved, 2 bits indicate whether a slot is reserved and 5 (or 7) bits indicate whether a symbol is reserved. A value 0 in the bitmap indicates that the corresponding symbol is invalid for downlink transmission, while a value 1 in the bitmap indicates that the corresponding symbol is valid for downlink transmission. A reversal of the value assignments or a different number of bits is possible.

Figure 9:
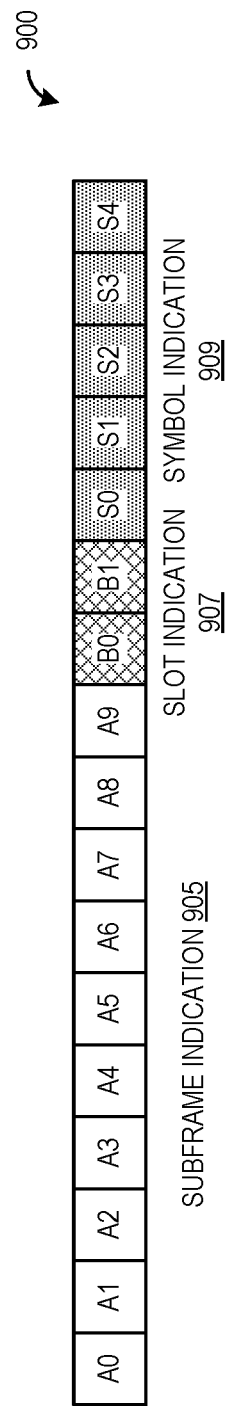
FIG. 9 illustrates a bitmap with 5 bits for the symbol indication for a NB-IoT downlink subframe configuration over loins according to example embodiments presented herein.

FIG. 9 illustrates a bitmap goo with 5 bits for the symbol indication for a NB-IoT downlink subframe configuration over 10 ms. As shown in FIG. 9, bitmap 900 includes a subframe indication 905, a slot indication 907, and a symbol indication 909. If the configuration is over 10 ms, the bitmap has size of 17 bits. If the configuration is over 40 ms, the bitmap has size of 47 bits. The slot and symbol indications may be applicable to each reserved subframe.

In an alternative to the configuration shown in FIG. 9, the symbol indication per subframe 909 and the slot indication 907 occur before the subframe indication 905, i.e., b0 b1 s0 s1 s2 s3 s4 a0 a1 a2 a3 a4 a5 a6 a7 a8 a9. Other arrangements are possible.

An example DL-Bitmap-NB-reserved-resources IE is as follows:

```
-- ASN1START
DL-Bitmap-NB-reserved-resources-r16 ::=    CHOICE {
    subframePattern10-r16                  BIT STRING (SIZE (17)),
    subframePattern40-r16                  BIT STRING (SIZE (47))
}
-- ASN1STOP.
```

If the bitmap comprises one bit for each symbol in a slot, i.e., 7 symbols, for the configuration over loins, the bitmap has size of 19 bits. For the configuration over 40 ms, the bitmap has size of 49 bits.

Slot-level resource reservations may also be performed.

According to an example embodiment, in a situation with slot-level reserved resource configurations in the DL, the configuration signaling is a bitmap of 20 or 80 bits where each bit indicates whether a slot is reserved for NB-IoT transmission. The NB-IoT downlink subframe configuration is over 10 ms or 40 ms for inband and 10 ms for standalone or guardband. In this embodiment, a bitmap of slot level indications is used instead of subframe level indications. The bitmap may further comprise symbol bitmaps, as shown in FIG. 4 with slot indications replacing subframe indications. As shown in FIG. 7 and FIG. 8, the symbol indications may be provided for none, one, or both of the slots of a subframe.

Figure 10:
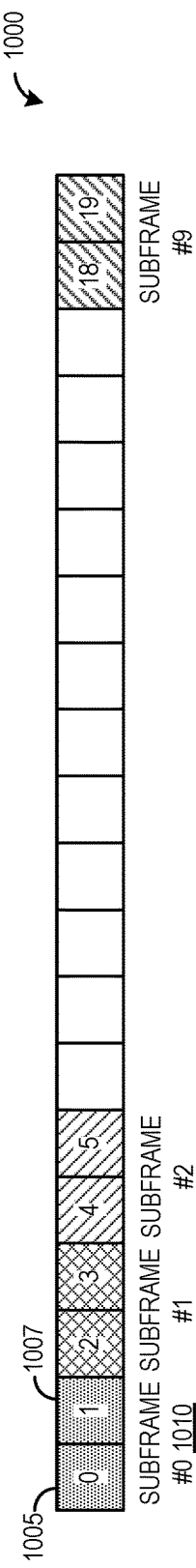
FIG. 10 illustrates a bitmap for a NB-IoT DL slot-level subframe configuration over 10 ms according to example embodiments presented herein.

FIG. 10 illustrates a bitmap 1000 for a NB-IoT DL slot-level subframe configuration over 10 ms. As shown in FIG. 10, bitmap 1000 includes slot indicators for each subframe, such as, slot indicator 1005 and 1007 for subframe 1010. If the configuration is over 40 ms, the bitmap has size of 80 bits. As an illustrative example, the first/leftmost bit corresponds to the first slot of subframe #0 of the radio frame satisfying SFN mod x=0, where x is the size of the bit string divided by 10. The second bit corresponds to the second slot of the subframe #0, and s0 on. A value 0 in the bitmap indicates that the corresponding slot is invalid for downlink transmission, while a value 1 in the bitmap indicates that the corresponding slot is valid for downlink transmission. A reversal of the value assignments or an alternate subframe arrangement is possible.

An example DL-Bitmap-NB-reserved-resources IE is as follows:

```
-- ASN1START
DL-Bitmap-NB-reserved-slot-r16 ::=    CHOICE {
    subframePattern10-r16             BIT STRING (SIZE (20)),
    subframePattern40-r16             BIT STRING (SIZE (80))
}
-- ASN1STOP.
```

According to an example embodiment, assuming the pattern of slot-reserved is the same for all subframes, a bitmap can be used to indicate which subframes have at least one reserved slot and which one of the two slots is reserved. For slot-level resource reservation in DL, the configuration signaling is a bitmap of 12 (or 42) bits where for the first 10 (or 40) bits, each bit indicates whether there is at least one reserved slot reserved for NB-IoT transmission in each subframe. The last two bits indicate if the $1^{st}$, $2^{nd}$, or both slot(s) are reserved:

If the value of {b0,b1} is {0,0} both slots are reserved;
If the value of {b0,b1} is {0,1} the first slot is reserved;
If the value of {b0,b1} is {1,0} the second slot is reserved;
If the value of {b0,b1} is {1,1}, unused.

An alternate value assignment is possible.

In this example embodiment, for configuring the subframe level granularity, the bitmap with 10 bits (as in existing specifications, IE DL-Bitmap-NB-r13) is used. For the embodiment 6, with the IE DL-Bitmap-NB-slot, both subframe and slot level granularity reservation can be signalled.

Figure 11:
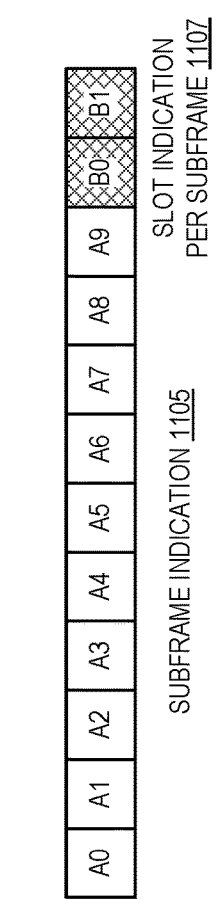
FIG. 11 illustrates a bitmap with 12 bits for a NB-IoT downlink subframe configuration over loins according to example embodiments presented herein.

FIG. 11 illustrates a bitmap 1100 with 12 bits for a NB-IoT downlink subframe configuration over 10 ms. As shown in FIG. 11, bitmap 1100 includes a subframe indication 1105 to indicate which subframe have reserved resources and a slot indication per subframe 1107 to indicate which slot of a subframe is reserved. If the configuration is over 40 ms, the bitmap has size of 42 bits.

In an alternative to the configuration shown in FIG. 11, the symbol indication per subframe 1107 occurs before the subframe indication 1105, i.e., b0 b1 a0 a1 a2 a3 a4 a5 a6 a7 a8 a9.

An example DL-Bitmap-NB-reserved-resources IE is as follows:

```
-- ASN1START
DL-Bitmap-NB-reserved-slot-r16 ::=    CHOICE {
    subframePattern10-r16             BIT STRING (SIZE (12)),
    subframePattern40-r16             BIT STRING (SIZE (42))
}
-- ASN1STOP.
```

According to an example embodiment, assuming the pattern of slot-reserved is the same for all subframes, a bitmap can be used to indicate which subframes have at least one reserved slot and which one of the two slots is reserved. For slot-level resource reservation in downlink, the configuration signaling is a bitmap of 11 (or 41) bits where for the first 10 (or 40) bits, each bit indicates whether there is at least one reserved slot reserved for NB-IoT transmission in each subframe. The last one bit indicates which slot is reserved:

If the value of{b0} is {0} the first slot is reserved;
If the value of{b0} is {1} the second slot is reserved.

In this example embodiment it is assumed that the existing signaling is used to indicate if both slots in a subframe are reserved (this is subframe-level granularity), and the new signaling indicates which slot in a subframe is reserved. This is different from the embodiment of FIG. 10, where the access node configures the UE only with the new signaling which indicates both which subframe has a reserved slot and which slot is reserved. In summary:

to configure the subframe level granularity (i.e., both slots in a subframe are reserved), the bitmap with 10 bits as in existing specifications (IE DL-Bitmap-NB-r13) is used.

to configure the slot-level granularity, with the restriction that only one slot per subframe is reserved, the bitmap with 11 bits in the example embodiment where dynamic DCI signaling is used to indicate that a resource is reserved is used.

Figure 12:
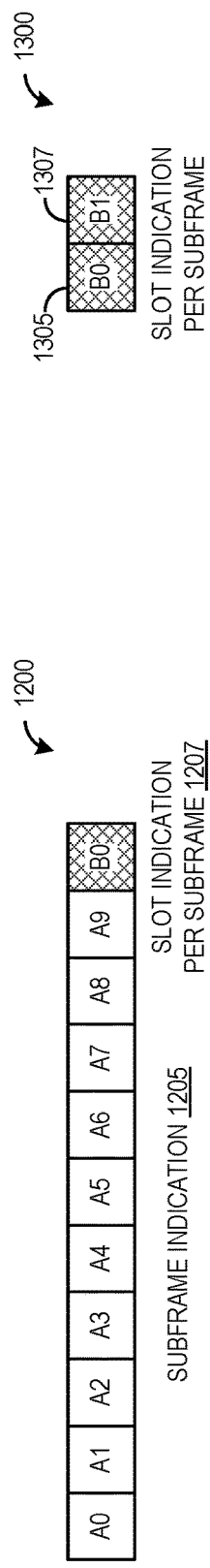
FIG. 12 illustrates a bitmap with 11 bits for a NB-IoT downlink subframe configuration over loins according to example embodiments presented herein.

FIG. 12 illustrates a bitmap 1200 with 11 bits for a NB-IoT downlink subframe configuration over 10 ms. As shown in FIG. 12, bitmap 1200 includes a subframe indication 1205 to indicate which subframe have reserved resources and a slot indication per subframe 1207 to indicate which slot of a subframe is reserved. If the configuration is over 40 ms, the bitmap has size of 41 bits.

In an alternative to the configuration shown in FIG. 12, the symbol indication per subframe 1207 occurs before the subframe indication 1205, i.e., b0 a0 a1 a2 a3 a4 a5 a6 a7 a8 a9.

An example DL-Bitmap-NB-reserved-resources IE is as follows:

```
-- ASN1START
DL-Bitmap-NB-reserved-slot-r16 ::=    CHOICE {
    subframePattern10-r16             BIT STRING (SIZE (11)),
    subframePattern40-r16             BIT STRING (SIZE (41))
}
-- ASN1STOP.
```

According to an example embodiment, when the access node configures both the existing bitmap for subframe resource reservation and the new bitmap, the access node configures the UE with the existing subframe-level resource reservation bitmap and a new bitmap of 2 bits. The existing bitmap indicates which subframes are reserved and the new bitmap of 2 bits indicates which slots are reserved.

The new bitmap indicates which slots are reserved:
If the value of{b0,b1} is {0,0} both slots are reserved;
If the value of{b0,b1} is {0,1} the first slot is reserved;
If the value of{b0,b1} is {1,0} the second slot is reserved;
If the value of{b0,b1} is {1,1}, unused.

An alternate value assignment is possible.

Figure 13:
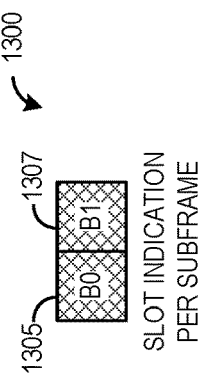
FIG. 13 illustrates a bitmap with 2 bits for a NB-IoT downlink subframe configuration over 10 ms or 40 ms according to example embodiments presented herein.

FIG. 13 illustrates a bitmap 1300 with 2 bits for a NB-IoT downlink subframe configuration over 10 ms or 40 ms. Bitmap 1300 includes bits 1305 and 1307 indicating which slot(s) are reserved.

According to an example embodiment, a combination of higher layer signaling and physical layer signaling is used to reserve resources. As an example, a higher layer signaling is used to configure the physical layer signaling. The indication of the reserved resources, e.g., reserved resource assignment, is carried by the DCI signaling which is configured by higher layer signaling.

In an embodiment, the size of the DCI field is a variable number of bits, e.g., size m, where the size of this signaling depends on the number of entries configured into the higher layer. The DCI bits reference a higher layer parameter (e.g., a list), and at higher layers a number of table values are selected. The higher layer parameter defines a pattern for the reserved resources: for example, all symbols in a slot are reserved, all symbols but the last two symbols are reserved, etc. The table values can be defined in physical layer or in higher layers.

The variable number of values selected from the table allows a device to reserve resources with flexible granularity depending on the number of values selected and on the granularity with which the table is constructed. Each selected value can refer to one symbol or to a group of symbols, and indicates whether the corresponding symbol or group of symbols is reserved.

Alternatively, the number of bits in the DCI is fixed, and the maximum number of table values that may be selected is less than or equal to 2 to the number of bits in the DCI. DCI bit entries beyond the configured table size are considered reserved and either are not sent by the eNB or not expected by the UE.

In an example, the following information is transmitted in the DCI: reserved resources assignment—0, 1, 2, 3, or 4 bits. The bitwidth for this field is determined as $\lceil \log_2(I) \rceil$ bits, where I is the number of entries in the higher layer parameter reserved-time-allocation-config-UL (or reserved-time-allocation-config-DL, for example) if the higher layer parameter is configured; otherwise I is the number of entries in the default table.

When the UE is scheduled to transmit a transport block, the reserved resources assignment field value m of the DCI provides a row index m+1 to an allocated table. In the table, the indexed row defines the pattern of resource reservation. Each value in the pattern can refer to one symbol or to a group of symbols. An exemplary table is provided below, with a 3 bits row index, where there are 4 groups of symbols. The groups of symbols for the UL are: 0 to 2, 3 to 6, 7 to 9, 10 to 13.

| Row index | Resource reservation mapping | Symbols reserved |
| --- | --- | --- |
| 1 | 1100 | 0 to 2, 3 to 6, |
| 2 | 1000 | 0 to 2 |
| 3 | 0100 | 3 to 6 |
| 4 | 0010 | 7 to 9 |
| 5 | 0001 | 10 to 13 |
| 6 | 0011 | 7 to 9, 10 to 13 |
| 7 | 1111 | 0 to 2, 3 to 6, 7 to 9, 10 to 13 |
| 8 | 1100 | Reserved or Not used |

Other examples of groups are for DL: 0 to 2, 3 to 4, 7 to 9, 1 to 11. Other groups are possible, such as UL: 0 to 3, 4 to 6, 7 to 10, 11 to 13. Another DL example is: 0 to 1, 2 to 4, 7 to 8, 9 to 11. Other possibilities with 3 or 4 in UL and 2 or 3 in DL are straightforward.

For example, 1 bit could indicate:

| Row index | Resource reservation mapping | Symbols reserved |
|---|---|---|
| 1 | 1100 | 0 to 2, 3 to 6, |
| 2 | 0011 | 7 to 9, 10 to 13 |

For example 2 bits could indicate:

| Row index | Resource reservation mapping | Symbols reserved |
|---|---|---|
| 1 | 1100 | 0 to 2, 3 to 6, |
| 2 | 0001 | 10 to 13 |
| 3 | 1111 | 0 to 2, 3 to 6, 7 to 9, 10 to 13 |
| 4 | 1100 | Reserved or Not used |

FIG. 14 illustrates a diagram 1400 of messages exchanged between devices reserving resources and communicating over the reserved resources. Diagram 1400 illustrates messages exchanged between a UE 1405 and an access node 1407 as the devices reserve resources and communicate over the reserved resources.

Access node 1407 sends an indication of reserved time resources (event 1410). The indication of the reserved time resources may be transmitted over higher layer signaling, such as radio resource control signaling, for example. As an example, the indication of the reserved time resources may be transmitted in the form of reservation information. The time resources may be reserved in a FDM manner, such as discussed above. Examples of the time resources include subframes, slots, symbols, groups of symbols, etc. Access node 1407 dynamically overrides reserved time resources (event 1412). Access node 1407 may dynamically override reserved time resources by sending an indication indicating reserved resources, available resources, or a combination thereof. The indication (i.e., a reservation indicator or a reservation indication) may be a single bit, or multiple bits. The indication may be dynamically sent using physical layer signaling, such as DCI signaling, for example. Access node 1407 may also signal the scheduling of data channels in event 1412. UE 1405 communicates (event 1414). UE 1405 may communicate to access node 1407, another device, or a combination of access node 1407 and another device, in accordance with the reserved time resources and any overrides of the reserved time resources. UE 1405 may use LTE, NR, NB-IoT, etc., as appropriate.

FIG. 15 illustrates a flow diagram of example operations 1500 occurring in an access node reserving resources and communicating over the reserved resources. Operations 1500 may be indicative of operations occurring in an access node as the access node reserves resources and communicates over the reserved resources.

Operations 1500 begin with the access node sending an indication of reserved time resources (block 1505). The indication of the reserved time resources may be transmitted over higher layer signaling, such as radio resource control signaling, for example. The time resources may be reserved in a FDM manner, such as discussed above. The indication of the reserved time resources may be referred to as reservation information. The access node dynamically overrides reserved time resources (block 1507). The access node may dynamically override reserved time resources by sending a reservation indication (or reservation indicator) indicating reserved resources, available resources, or a combination thereof. The indication may be a single bit, or multiple bits. The resources may be subframes, slots, symbols, PRBs, groups of symbols, groups of PRBs, etc. The reservation indication may be dynamically sent using physical layer signaling, such as DCI signaling, for example. The access node may also signal the scheduling of data channels in block 1507. In an embodiment, the physical layer signaling that includes the reservation indication also includes a resource assignment that indicates an available time resource the receiver uses to communicate with the access node. In another embodiment, the receiver selects an available time resource to use to communicate with the access node. The access node communicates in accordance with the reserved time resources and overrides (block 1509). The access node may communicate with a UE, for example, using LTE, NR, NB-IoT, etc., as appropriate. Communicating with the UE may involve transmitting to the UE in a downlink transmission or receiving from the UE in an uplink transmission.

FIG. 16 illustrates a flow diagram of example operations 1600 occurring in a UE receiving indications of reserved resources and communicating over the reserved resources. Operations 1600 may be indicative of operations occurring in a UE as the UE receives indications of reserved resources and communicates over the reserved resources.

Operations 1600 begin with the UE receiving an indication of reserved time resources (block 1605). The indication of the reserved time resources may be received over higher layer signaling, such as radio resource control signaling, for example. The time resources may be reserved in a FDM manner, such as discussed above. The indication of the reserved time resources may be referred to as reservation information. The UE receives dynamically signaled overrides of reserved time resources (block 1607). The UE may dynamically receive overrides of reserved time resources when receiving an indication indicating reserved resources, available resources, or a combination thereof. The indication may be a single bit, or multiple bits. The resources may be subframes, slots, symbols, groups of symbols, etc. The indication may be dynamically received using physical layer signaling, such as DCI signaling, for example. The UE may also receive the scheduling of data channels in block 1607. In an embodiment, the physical layer signaling that includes the reservation indication also includes a resource assignment that indicates an available time resource the UE uses to communicate. In another embodiment, the UE selects an available time resource to use to communicate, the selection of the available time resource being in accordance with the reserved time resources and any overrides of the reserved time resources. The UE communicates in accordance with the reserved time resources and overrides (block 1609). The UE may communicate with an access node, for example, using LTE, NR, NB-IoT, etc., as appropriate. Communicating with the access node may involve transmitting to the access node in an uplink transmission or receiving from the access node in a downlink transmission.

Figure 17:
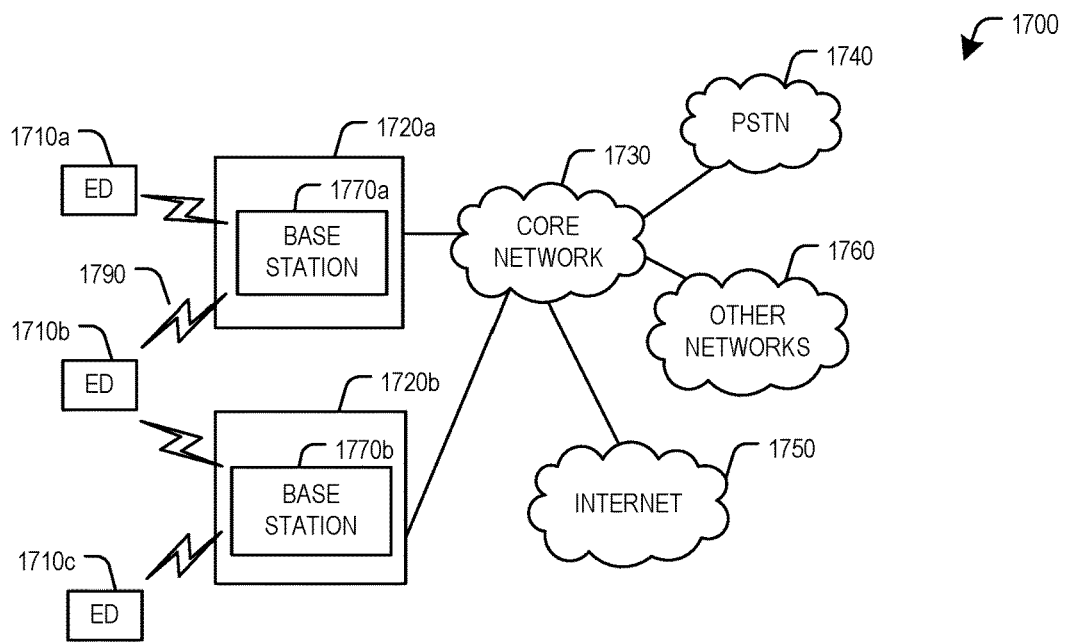
FIG. 17 illustrates an example communication system according to example embodiments presented herein.

FIG. 17 illustrates an example communication system 1700. In general, the system 1700 enables multiple wireless or wired users to transmit and receive data and other content. The system 1700 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1700 includes electronic devices (ED) 1710*a*-1710*c*, radio access networks (RANs) 1720*a*-1720*b*, a core network 1730, a public switched telephone network (PSTN) 1740, the Internet 1750, and other networks 1760. While certain numbers of these components or elements are shown in FIG. 17, any number of these components or elements may be included in the system 1700.

The EDs 1710*a*-1710*c* are configured to operate or communicate in the system 1700. For example, the EDs 1710*a*-1710*c* are configured to transmit or receive via wireless or wired communication channels. Each ED 1710*a*-1710*c* represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1720*a*-1720*b* here include base stations 1770*a*-1770*b*, respectively. Each base station 1770*a*-1770*b* is configured to wirelessly interface with one or more of the EDs 1710*a*-1710*c* to enable access to the core network 1730, the PSTN 1740, the Internet 1750, or the other networks 1760. For example, the base stations 1770*a*-1770*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1710*a*-1710*c* are configured to interface and communicate with the Internet 1750 and may access the core network 1730, the PSTN 1740, or the other networks 1760.

In the embodiment shown in FIG. 17, the base station 1770*a* forms part of the RAN 1720*a*, which may include other base stations, elements, or devices. Also, the base station 1770*b* forms part of the RAN 1720*b*, which may include other base stations, elements, or devices. Each base station 1770*a*-1770*b* operates to transmit or receive wireless signals within a particular geographic region or area, sometimes referred to as a "cell." In some embodiments, multiple-input multiple-output (MIMO) technology may be employed having multiple transceivers for each cell.

The base stations 1770*a*-1770*b* communicate with one or more of the EDs 1710*a*-1710*c* over one or more air interfaces 1790 using wireless communication links. The air interfaces 1790 may utilize any suitable radio access technology.

It is contemplated that the system 1700 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1720*a*-1720*b* are in communication with the core network 1730 to provide the EDs 1710*a*-1710*c* with voice, data, application, Voice over Internet Protocol (VoIP), or other services. Understandably, the RANs 1720*a*-1720*b* or the core network 1730 may be in direct or indirect communication with one or more other RANs (not shown). The core network 1730 may also serve as a gateway access for other networks (such as the PSTN 1740, the Internet 1750, and the other networks 1760). In addition, some or all of the EDs 1710*a*-1710*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 1750.

Although FIG. 17 illustrates one example of a communication system, various changes may be made to FIG. 17. For example, the communication system 1700 could include any number of EDs, base stations, networks, or other components in any suitable configuration.

Figure 18A:
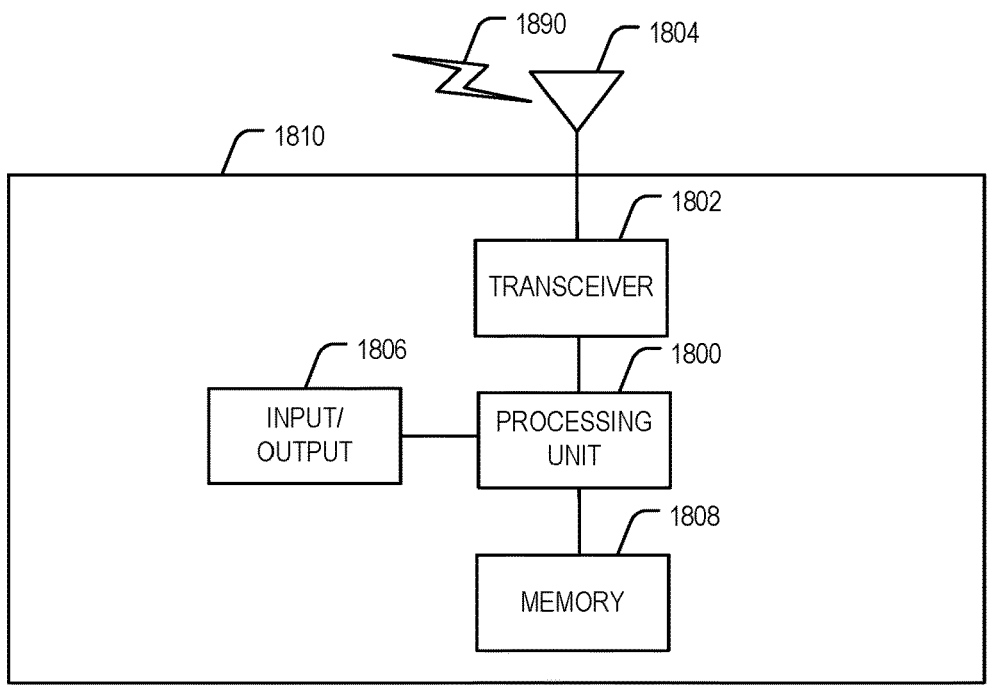
FIGS. 18A and 18B illustrate example devices that may implement the methods and teachings according to this disclosure.
Figure 18B:
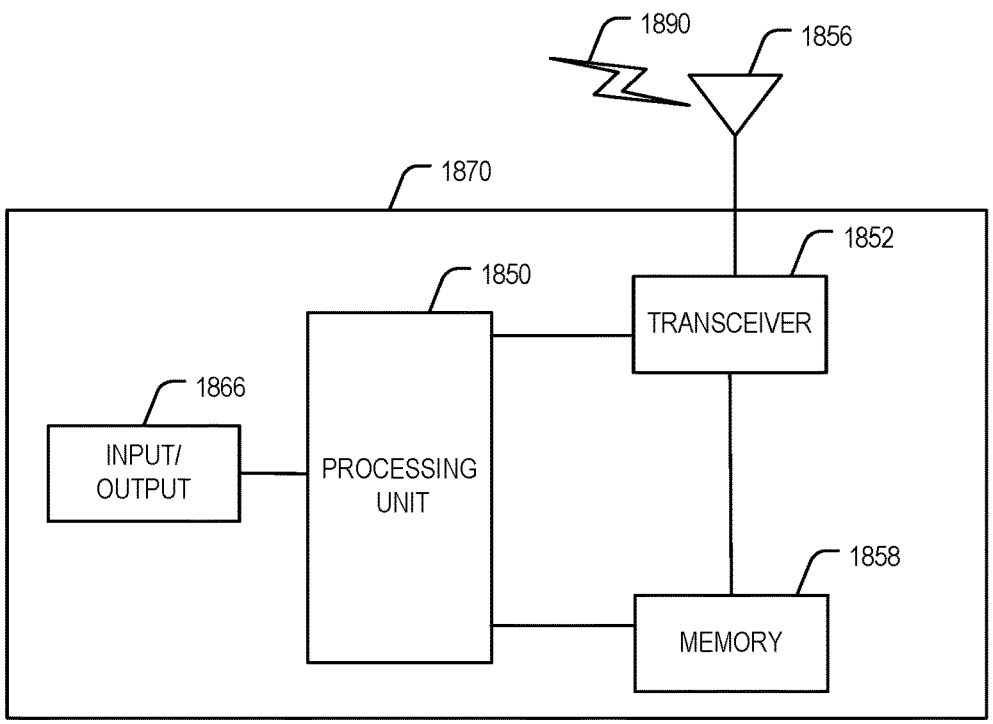

FIGS. 18A and 18B illustrate example devices that may implement the methods and teachings according to this disclosure. In particular, FIG. 18A illustrates an example ED 1810, and FIG. 18B illustrates an example base station 1870. These components could be used in the system 1700 or in any other suitable system.

As shown in FIG. 18A, the ED 1810 includes at least one processing unit 1800. The processing unit 1800 implements various processing operations of the ED 1810. For example, the processing unit 1800 could perform signal coding, data processing, power control, input/output processing, or any other functionality enabling the ED 1810 to operate in the system 1700. The processing unit 1800 also supports the methods and teachings described in more detail above. Each processing unit 1800 includes any suitable processing or computing device configured to perform one or more operations. Each processing unit 1800 could, for example, include a microprocessor, microcontroller, digital signal processor, field programmable gate array, or application specific integrated circuit.

The ED 1810 also includes at least one transceiver 1802. The transceiver 1802 is configured to modulate data or other content for transmission by at least one antenna or NIC (Network Interface Controller) 1804. The transceiver 1802 is also configured to demodulate data or other content received by the at least one antenna 1804. Each transceiver 1802 includes any suitable structure for generating signals for wireless or wired transmission or processing signals received wirelessly or by wire. Each antenna 1804 includes any suitable structure for transmitting or receiving wireless or wired signals. One or multiple transceivers 1802 could be used in the ED 1810, and one or multiple antennas 1804 could be used in the ED 1810. Although shown as a single functional unit, a transceiver 1802 could also be implemented using at least one transmitter and at least one separate receiver.

The ED 1810 further includes one or more input/output devices 1806 or interfaces (such as a wired interface to the Internet 1750). The input/output devices 1806 facilitate interaction with a user or other devices (network communications) in the network. Each input/output device 1806 includes any suitable structure for providing information to or receiving information from a user, such as a speaker, microphone, keypad, keyboard, display, or touch screen, including network interface communications.

In addition, the ED 1810 includes at least one memory 1808. The memory 1808 stores instructions and data used, generated, or collected by the ED 1810. For example, the memory 1808 could store software or firmware instructions executed by the processing unit(s) 1800 and data used to reduce or eliminate interference in incoming signals. Each memory 1808 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 18B, the base station 1870 includes at least one processing unit 1850, at least one transceiver 1852, which includes functionality for a transmitter and a receiver, one or more antennas 1856, at least one memory 1858, and one or more input/output devices or interfaces 1866. A scheduler, which would be understood by one skilled in the art, is coupled to the processing unit 1850. The scheduler could be included within or operated separately from the base station 1870. The processing unit 1850 implements various processing operations of the base station 1870, such as signal coding, data processing, power control, input/output processing, or any other functionality. The processing unit 1850 can also support the methods and teachings described in more detail above. Each processing unit 1850 includes any suitable processing or computing device configured to perform one or more operations. Each processing unit 1850 could, for example, include a microprocessor, microcontroller, digital signal processor, field programmable gate array, or application specific integrated circuit.

Each transceiver 1852 includes any suitable structure for generating signals for wireless or wired transmission to one or more EDs or other devices. Each transceiver 1852 further includes any suitable structure for processing signals received wirelessly or by wire from one or more EDs or other devices. Although shown combined as a transceiver 1852, a transmitter and a receiver could be separate components. Each antenna 1856 includes any suitable structure for transmitting or receiving wireless or wired signals. While a common antenna 1856 is shown here as being coupled to the transceiver 1852, one or more antennas 1856 could be coupled to the transceiver(s) 1852, allowing separate antennas 1856 to be coupled to the transmitter and the receiver if equipped as separate components. Each memory 1858 includes any suitable volatile or non-volatile storage and retrieval device(s). Each input/output device 1866 facilitates interaction with a user or other devices (network communications) in the network. Each input/output device 1866 includes any suitable structure for providing information to or receiving/providing information from a user, including network interface communications.

Figure 19:
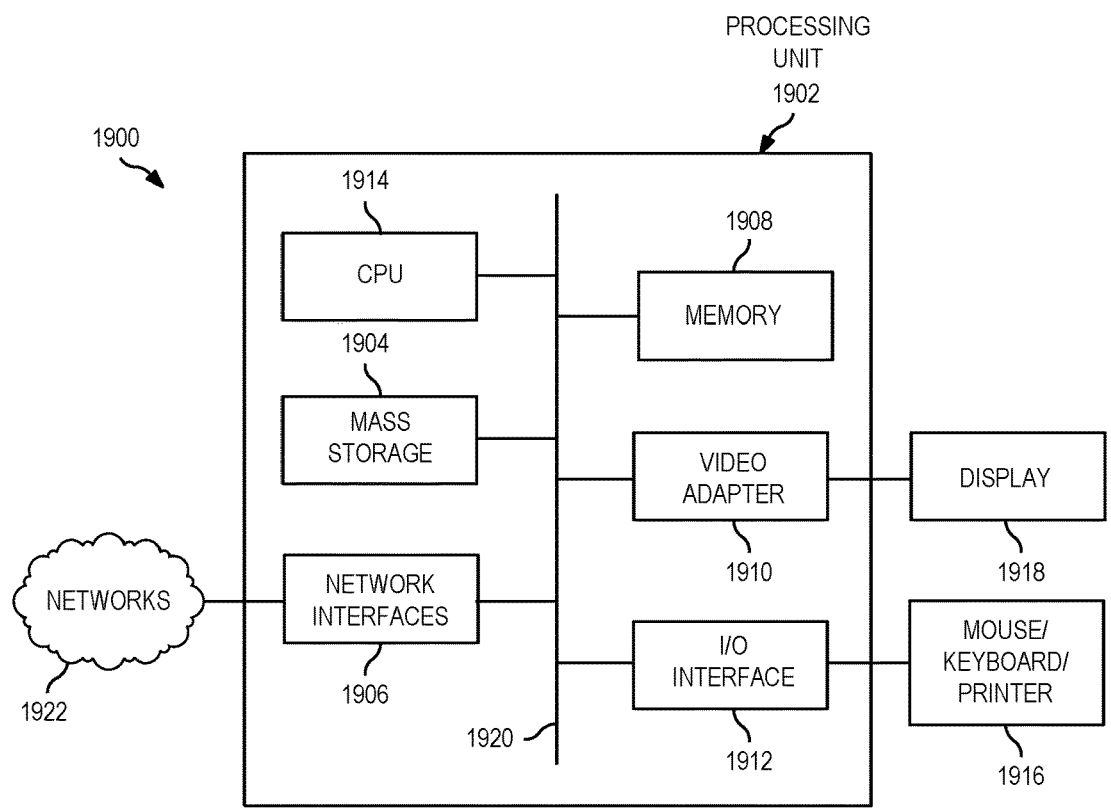
FIG. 19 is a block diagram of a computing system that may be used for implementing the devices and methods disclosed herein.

FIG. 19 is a block diagram of a computing system 1900 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1900 includes a processing unit 1902. The processing unit includes a central processing unit (CPU) 1914, memory 1908, and may further include a mass storage device 1904, a video adapter 1910, and an I/O interface 1912 connected to a bus 1920.

The bus 1920 may be one or more of any type of several bus architectures including a memory bus or memory controller, a peripheral bus, or a video bus. The CPU 1914 may comprise any type of electronic data processor. The memory 1908 may comprise any type of non-transitory system memory such as static random access memory (SRAM), dynamic random access memory (DRAM), synchronous DRAM (SDRAM), read-only memory (ROM), or a combination thereof. In an embodiment, the memory 1908 may include ROM for use at boot-up, and DRAM for program and data storage for use while executing programs.

The mass storage 1904 may comprise any type of non-transitory storage device configured to store data, programs, and other information and to make the data, programs, and other information accessible via the bus 1920. The mass storage 1904 may comprise, for example, one or more of a solid state drive, hard disk drive, a magnetic disk drive, or an optical disk drive.

The video adapter 1910 and the I/O interface 1912 provide interfaces to couple external input and output devices to the processing unit 1902. As illustrated, examples of input and output devices include a display 1918 coupled to the video adapter 1910 and a mouse, keyboard, or printer 1916 coupled to the I/O interface 1912. Other devices may be coupled to the processing unit 1902, and additional or fewer interface cards may be utilized. For example, a serial interface such as Universal Serial Bus (USB) (not shown) may be used to provide an interface for an external device.

The processing unit 1902 also includes one or more network interfaces 1906, which may comprise wired links, such as an Ethernet cable, or wireless links to access nodes or different networks. The network interfaces 1906 allow the processing unit 1902 to communicate with remote units via the networks. For example, the network interfaces 1906 may provide wireless communication via one or more transmitters/transmit antennas and one or more receivers/receive antennas. In an embodiment, the processing unit 1902 is coupled to a local-area network 1922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
receiving, by a first device from a second device, a higher layer message including reservation information for time domain network resources available for communicating with a plurality of wireless communication protocols, the reservation information comprising a first bitmap associated with the time domain network resources, wherein the first bitmap is 20 bits or 80 bits in length for slot-level resource reservation and includes 2 bits per subframe indicating whether a slot in a subframe is reserved for transmissions;
receiving, by the first device from the second device, a dynamically signaled message including a reservation indicator of a reservation status of a time domain network resource from the time domain network resources for communicating using a wireless communication protocol; and
communicating, by the first device, using machine to machine communications over the wireless communication protocol, the communicating occurring over an available time domain network resource from the time domain network resources.

2. The method of claim 1, the dynamically signaled message further including a resource assignment indicating the available time domain network resource.

3. The method of claim 1, further comprising selecting, by the first device, the available time domain network resource from the time domain network resources, the selecting being in accordance with the reservation indicator.

4. The method of claim 1, the dynamically signaled message comprising a downlink control information (DCI) message.

5. The method of claim 1, the reservation indicator comprising a single bit indicator associated with the time domain network resource.

6. The method of claim 5, the reservation indicator being equal to 1 indicating the reservation status of the time domain network resource being available.

7. The method of claim 5, the reservation indicator being equal to o (zero) indicating follow the reservation information associated with the time domain network resource.

8. The method of claim 1, the reservation indicator comprising two bits, with a first bit corresponding to a first subframe of a slot and a second bit corresponding to a second subframe of the slot.

9. The method of claim 1, the first device comprising a user equipment (UE) and the second device comprising an access node.

10. The method of claim 1, the time domain network resources comprising at least one of subframes, slots, symbols, or groups of symbols.

11. The method of claim 1, the reservation information comprising a second bitmap associated with the time domain network resources, wherein the second bitmap is 7 bits for symbol-level resource reservation.

12. A method comprising:
sending, by a first device to a second device, a higher layer message including reservation information for time domain network resources available for communicating over a plurality of wireless communication protocols, the reservation information comprising a first bitmap associated with the time domain network resources, wherein the first bitmap is 20 bits or 80 bits in length for slot-level resource reservation and includes 2 bits per subframe indicating whether a slot in the subframe is reserved for transmissions;
sending, by the first device to the second device, a dynamically signaled message including a reservation indicator indicating a reservation status of a time domain network resource from the time domain network resources for communicating using a first wireless communication protocol; and
communicating, by the first device, using machine to machine communications over the wireless communication protocol, the communicating being in accordance with the reservation indicator.

13. The method of claim 12, the dynamically signaled message further including a resource assignment indicating an available time domain network resource, and the communicating occurring over the available time domain network resource.

14. The method of claim 12, the reservation indicator comprising a single bit indicator associated with the time domain network resource.

15. The method of claim 14, the reservation indicator being equal to 1 indicating the reservation status of the time domain network resource being available.

16. The method of claim 14, the reservation indicator being equal to o (zero) indicating follow the reservation information associated with the time domain network resource.

17. The method of claim 12, the second device comprising a user equipment (UE) and the first device comprising an access node.

18. The method of claim 12, the reservation information comprising a second bitmap associated with the time domain network resources, wherein the second bitmap is 7 bits for symbol-level resource reservation.

19. A first device comprising:
one or more processors; and
a non-transitory memory storage comprising instructions that, when executed by the one or more processors, cause the first device to perform operations, the operations comprising:
receiving, from a second device, a higher layer message including reservation information for time domain network resources available for communicating with a plurality of wireless communication protocols, the reservation information comprising a first bitmap associated with the time domain network resources, wherein the first bitmap is 20 bits or 80 bits in length for slot-level resource reservation and includes 2 bits per subframe indicating whether a slot in the subframe is reserved for transmissions;
receiving, from the second device, a dynamically signaled message including a reservation indicator indicating a reservation status of a time domain network resource from the time domain network resources for communicating using a wireless communication protocol; and
communicating using machine to machine communications over the wireless communication protocol, the communicating occurring over an available time domain network resource from the time domain network resources.

20. The first device of claim 19, the dynamically signaled message further including a resource assignment indicating the available time domain network resource.

21. The first device of claim 19, the operations further comprising:
selecting the available time domain network resource from the time domain network resources, the available time domain network resource being selected in accordance with the reservation indicator.

22. The first device of claim 19, the dynamically signaled message comprising a downlink control information (DCI) message.

23. The first device of claim 19, the reservation indicator comprising a single bit indicator associated with the time domain network resource.

24. The first device of claim 23, the reservation indicator being equal to 1 indicating the reservation status of the time domain network resource being available.

25. The first device of claim 23, the reservation indicator being equal to 0 (zero) indicating follow the reservation information associated with the time domain network resource.

26. The first device of claim 19, the reservation indicator comprising a second bitmap associated with the time domain network resource.

27. The first device of claim 19, the reservation indicator comprising two bits, with a first bit corresponding to a first subframe of a slot and a second bit corresponding to a second subframe of the slot.

28. A first device comprising:
- one or more processors; and
- a non-transitory memory storage comprising instructions that, when executed by the one or more processors, cause the first device to perform operations, the operations comprising:
  - sending, to a second device, a higher layer message including reservation information for time domain network resources available for communicating over a plurality of wireless communication protocols, the reservation information comprising a first bitmap associated with the time domain network resources, wherein the first bitmap is 20 bits or 80 bits in length for slot-level resource reservation and includes 2 bits per subframe indicating whether a slot in the subframe is reserved for transmissions;
  - sending, to the second device, a dynamically signaled message including a reservation indicator indicating a reservation status of a time domain network resource from the time domain network resources for communicating using a first wireless communication protocol; and
  - communicating using machine to machine communications over the wireless communication protocol, the communicating being in accordance with the reservation indicator.

29. The first device of claim 28, the dynamically signaled message further including a resource assignment indicating an available time domain network resource, and the communicating occurring over the available time domain network resource.

30. The first device of claim 28, the reservation indicator comprising a single bit indicator associated with the time domain network resource.

31. The first device of claim 30, the reservation indicator being equal to 1 indicating the reservation status of the time domain network resource being available.

32. The first device of claim 30, the reservation indicator being equal to 0 (zero) indicating follow the reservation information associated with the time domain network resource.

33. The first device of claim 28, the reservation information comprising a second bitmap associated with the time domain network resources, wherein the second bitmap is 7 bits for symbol-level resource reservation.

\* \* \* \* \*

UNITED STATES PATENT AND TRADEMARK OFFICE
CERTIFICATE OF CORRECTION

PATENT NO. : 12,376,076 B2
APPLICATION NO. : 17/662303
DATED : July 29, 2025
INVENTOR(S) : Cozzo et al.

Page 1 of 1

It is certified that error appears in the above-identified patent and that said Letters Patent is hereby corrected as shown below:

In the Claims

In Column 25, in Claim 7, Line 22, after "equal to" delete "o" and insert -- 0 --.

In Column 26, in Claim 16, Line 5, after "equal to" delete "o" and insert -- 0 --.

Signed and Sealed this
Second Day of September, 2025

Coke Morgan Stewart
*Acting Director of the United States Patent and Trademark Office*